Dec. 26, 1922.
C. W. McKINLEY.
INTERNAL GEAR DRIVE AXLE.
FILED DEC. 7, 1917.
1,439,968.
4 SHEETS—SHEET 1.
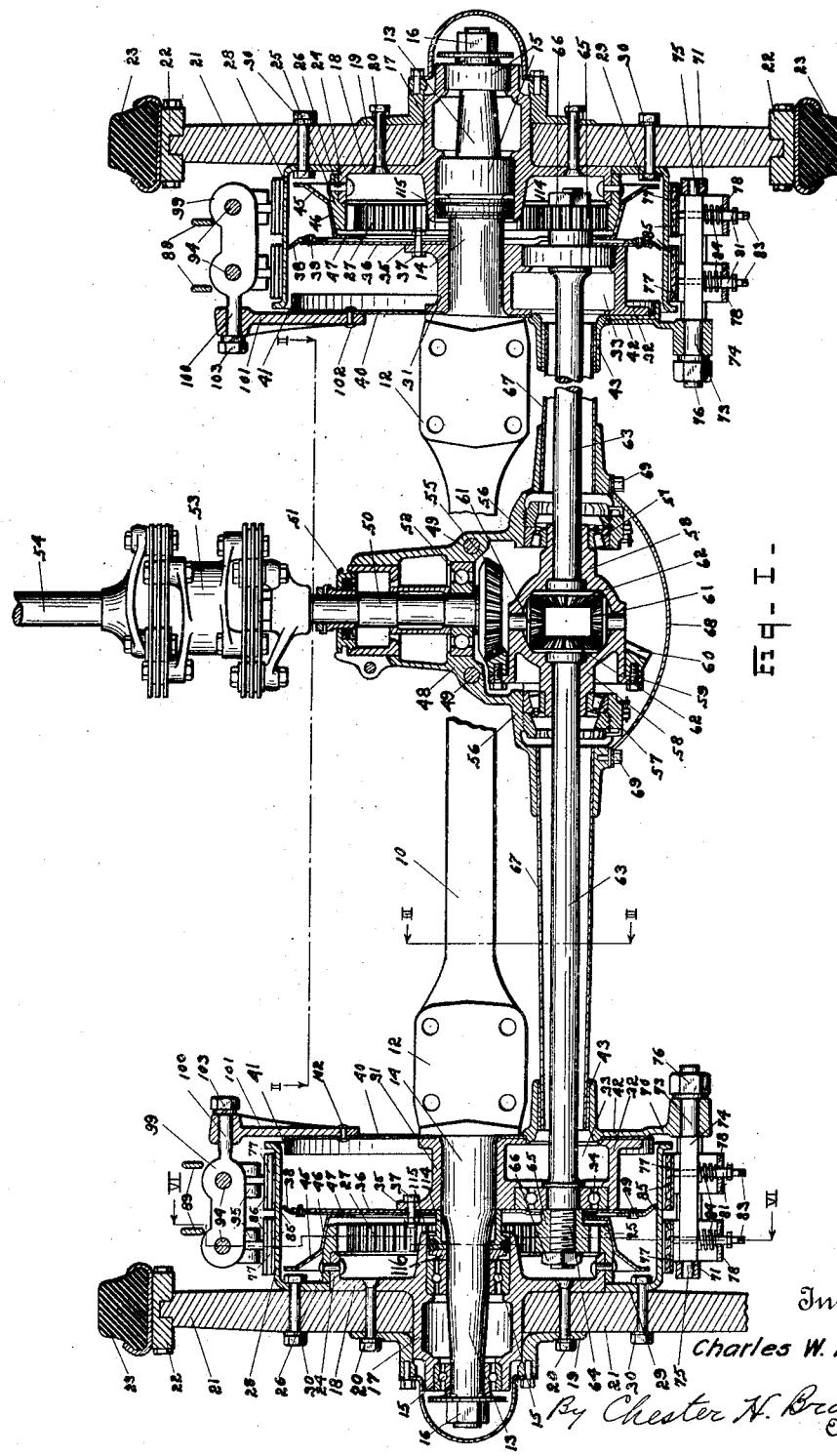
Inventor
Charles W. McKinley
By Chester N. Braselton
Attorney

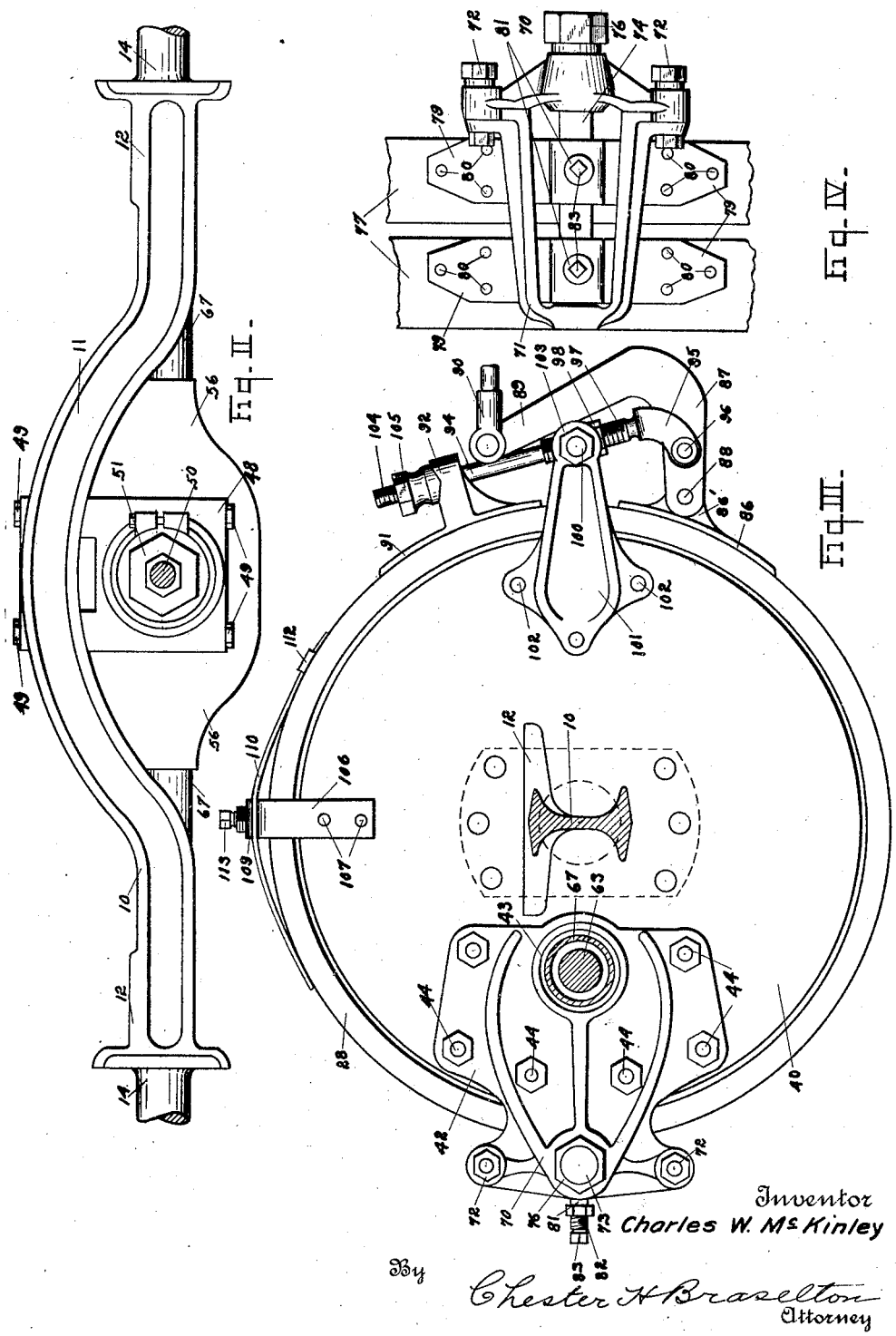

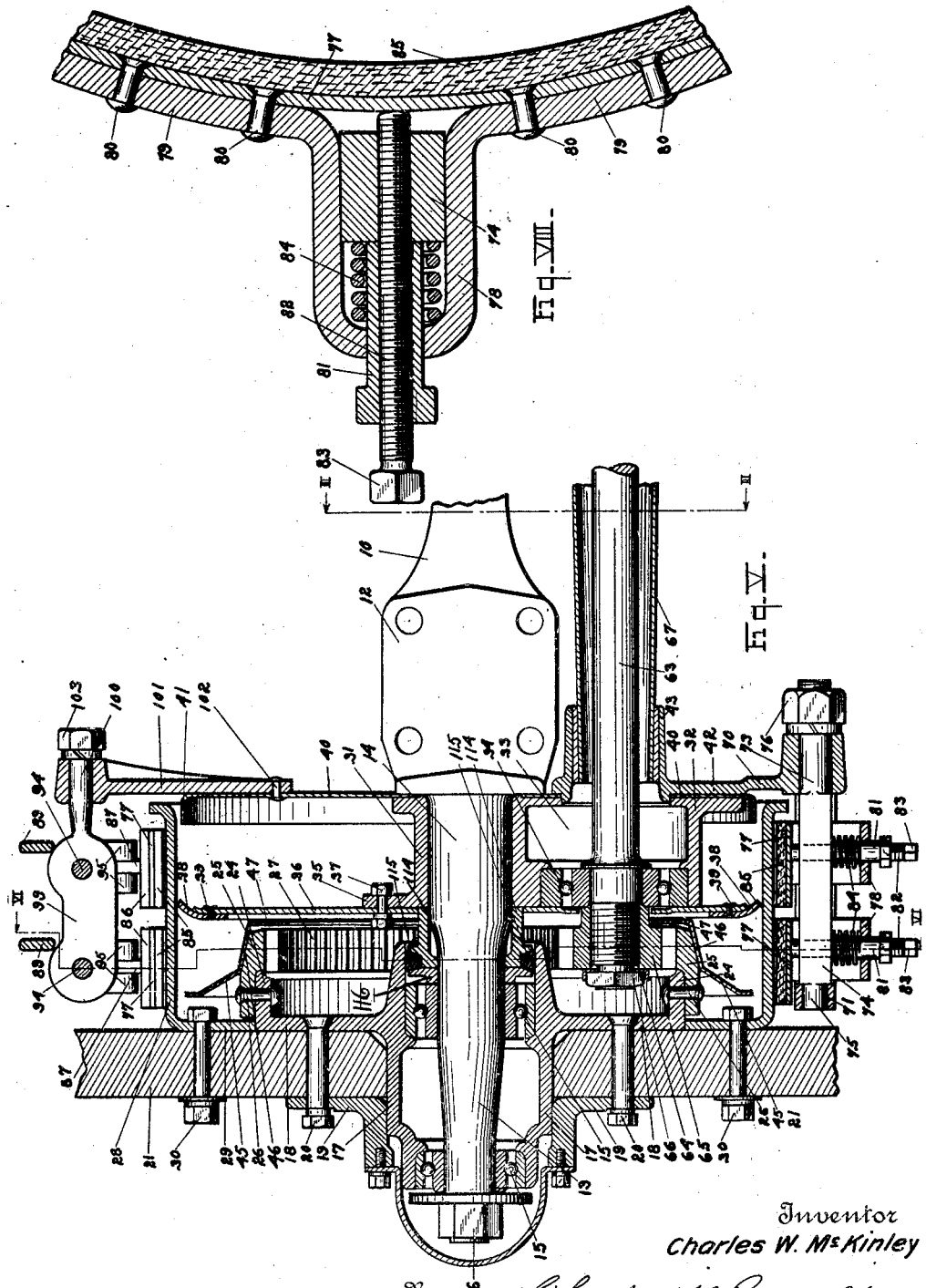

Dec. 26, 1922.
C. W. McKINLEY.
INTERNAL GEAR DRIVE AXLE.
FILED DEC. 7, 1917.
1,439,968.
4 SHEETS—SHEET 4.
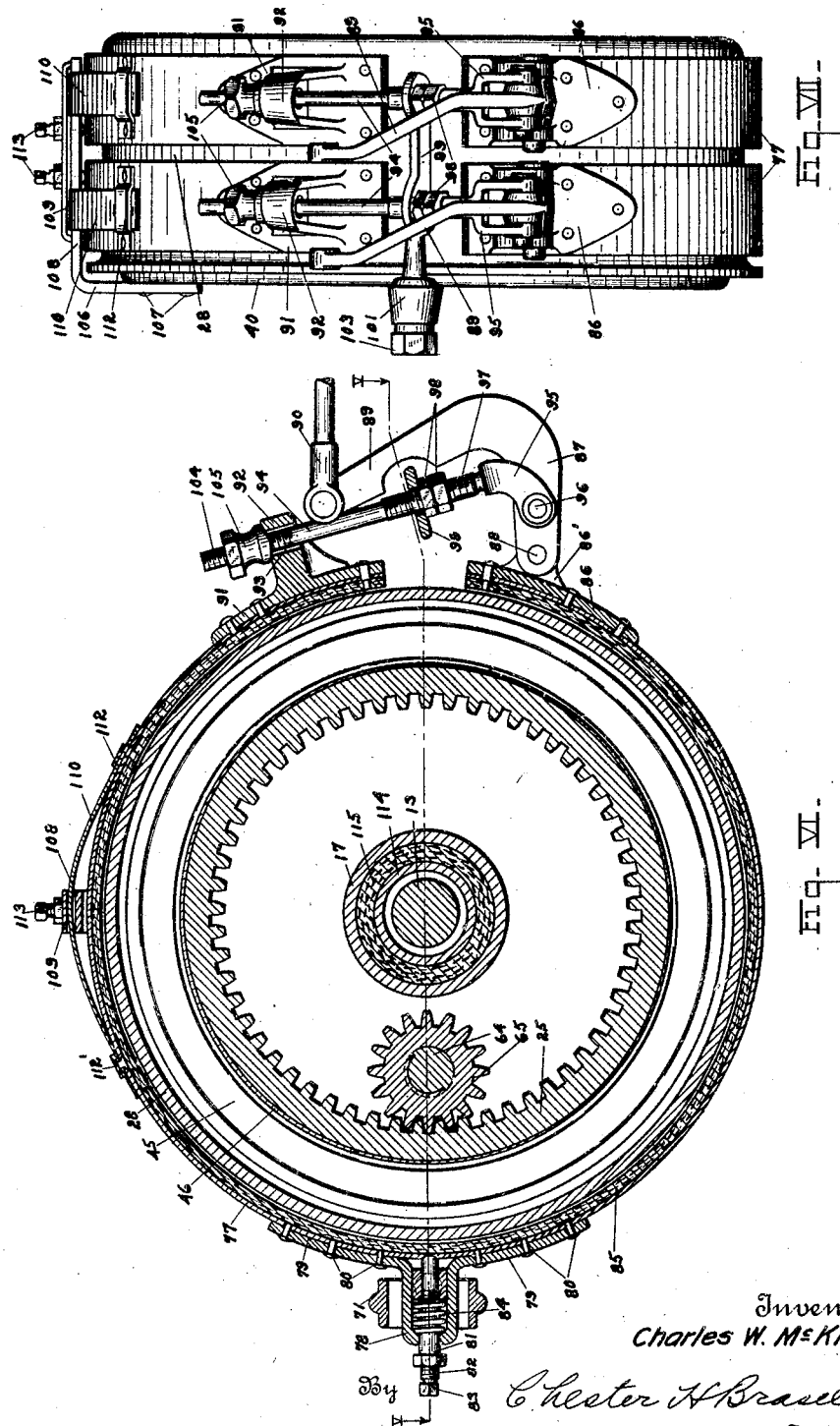
Inventor
Charles W. McKinley
By Chester H Braselton
Attorney Patented Dec. 26, 1922.

1,439,968

UNITED STATES PATENT OFFICE.

CHARLES W. McKINLEY, OF TOLEDO, OHIO, ASSIGNOR TO THE WILLYS-OVERLAND COMPANY, OF TOLEDO, OHIO, A CORPORATION OF OHIO.

INTERNAL-GEAR-DRIVE AXLE.

Application filed December 7, 1917. Serial No. 205,973.

*To all whom it may concern:*

Be it known that I, CHARLES W. McKINLEY, a citizen of the United States, residing at Toledo, in the county of Lucas and State of Ohio, have invented certain new and useful Improvements in Internal-Gear-Drive Axles, of which I declare the following to be a full, clear, and exact description.

This invention relates to improvements in internal gear drive axles for motor vehicles.

The principal object of this invention is to provide an internal gear drive axle having improved means for retaining lubricant in contact with the internal gears and the pinions meshing therewith.

A further object of this invention is to provide an internal gear drive axle having an improved dust guard for keeping dust and dirt out of the gears so as to prevent their being worn and injured by the sand and dust.

A further object of this invention is to provide an improved driving axle arrangement, in which the differential casing is suspended from the axle and the drive shafts are disposed in the rear of the axle so as to drive internal gears mounted on the wheels journaled on the axle.

A further object of this invention is to provide an improved brake arrangement for use in connection with internal gear drive axles.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which Fig. I is a horizontal, sectional view, taken through an axle embodying my invention, parts of the axle being broken away for convenience in illustration.

Fig. II is a sectional, elevational view of the axle, taken substantially on the line II—II of Fig. I.

Fig. III is a sectional, elevational view of a portion of the axle, taken substantially on the line III—III of Figs. I and V.

Fig. IV is a fragmentary, plan view of a portion of the brake band supporting mechanism.

Fig. V is an enlarged, fragmentary, sectional view, corresponding to Fig. I at the left hand side of said figure, and taken substantially on the line V—V of Fig. VI.

Fig. VI is a detail, sectional view, taken substantially on the line VI—VI of Figs. I and V.

Fig. VII is a view in front elevation of the brake mechanism.

Fig. VIII is a detail, sectional view, corresponding to a part of Fig. VI.

In the drawings, similar reference numerals refer to similar parts throughout the several views, and the sectional views are taken looking in the direction of the little arrows at the ends of the section lines.

Considering the numbered parts of the drawing, I have shown an internal gear drive mechanism comprising an I-beam axle 10, which is arched upwardly at its central point at 11. The flattened and enlarged portions 12 are provided near the ends of the axle to which the springs may be attached by spring shackles in the usual manner. Spindles are provided at the ends of the axle comprising the outer and smaller diameter spindle portions 13, and the inner and larger diameter spindle portions 14. Bearings 15 are mounted on the spindle portions 13, and nuts 16 are threaded on the outer ends of the spindles and retain the bearings in position. The hubs 17 are mounted and journaled on the bearings 15, and each of said hubs is provided with an annular spoke flange 18, as shown in Fig. V of the drawing. Another spoke flange 19 is provided and the spokes 21 are retained between the spoke flanges 18 and 19 by means of the bolts 20 passing through both of said spoke flanges and through the spokes. The spokes 21 carry the usual felly 22 and the tire 23.

The spoke flange 18 is provided at its periphery with a laterally extending annular flange 24. An internal gear 25 is provided which is attached to said flange 24 by means of the bolts or rivets 26, said internal gear being provided with the gear teeth 27 on its inner surface. A brake drum 28 has the laterally turned annular flange 29, the inner edge of which abuts the outer edge of the spoke flange 18, said flange 29 being secured in place by means of the bolts 30 passing through the spokes 21.

A hub 31 is mounted on the spindle portion 14 and provided with a rearwardly extending portion 32, having an opening 33 therein, and a bearing 34 mounted in said opening. The hub 31 is provided with an annular flange 35, on its outer portion, to which a disc 36 is secured by means of the bolts 37. A flexible piece 38 of fabric, or other suitable material, is secured to the periphery of the disc 36 by the fastening means 39. The sleeve 114 is mounted on the spindle portion 13 at the place where the spindle portion 13 merges into the portion 14, and said sleeve 114 carries a packing ring 115, which engages the interior of the inner end of the hub 17, inside of the inner bearing 15.

A disc 40 is mounted on the spindle portion 14 between the axle 10 and the hub 31, and said disc 40 closes the inner open end of the brake drum 28 and is provided with an outwardly-turned peripheral flange 41. A bracket member 42 is secured to the disc 40 and to the hub portion 32 by means of the bolts 44 and is provided with an inwardly extending boss 43. A grease retaining ring 45 is provided, having a beveled portion 46, which fits over the beveled exterior surface of the internal gear 25, and also provided with an inwardly directed annular flange 47. This ring may be stamped out of metal and pressed on over the exterior of the gear 25. Flange 47 extends inwardly a substantial distance beyond the inner edge of the internal gear.

The differential casing 48 is disposed beneath the arched portion 11 of the axle 10, and suspended therefrom by means of the bolts 49, which pass upwardly through the differential casing 48 and through the arched portion 11 of the axle. A drive shaft 50 is journaled in the bearing 52 mounted in the differential casing, and passes through the stuffing box 51, carried by said differential casing. The drive shaft 50 is connected by the universal joint 53 with the propeller shaft 54. The bevel pinion 55 is mounted on the end of the drive shaft 50 within the differential casing. The differential casing is provided with the laterally extending portions 56, within which are mounted the bearings 57. The differential cage is provided with the hubs 58, which are journaled in the bearings 57, and the differential cage has a flange 59 to which the bevel gear 60 is bolted, said gear 60 meshing with the bevel pinion 55, mounted on the drive shaft 50. The differential cage carries the bevel pinions 61, which mesh with the bevel pinions 62 in the usual manner. Drive shafts 63 have their inner ends extending into the differential casing and into the differential cage, and having a driving connection with the pinions 62. The outer end of each of these drive shafts 63, extends through one of the openings 33, in the portions 32 of the hubs 31, and is journaled in the bearing 34 in said hub portion. The outer end of each drive shaft 63 is threaded at 64 and carries the pinion 65 thereon, held in place by the nut 66. The pinion 65 meshes with the internal gear teeth 27. The rear end of the differential casing is open and closed by the cap 68 held in place by bolts 69.

The rearwardly extending portion 70 of the bracket member 42 carries a bar having a cylindrical portion 73, mounted in the bracket portion 70, and a square portion 74, which extends transversely of and outside of the brake drum 48. The yoke 71 has its ends secured to the bracket 70 by means of the bolts 72, and the end of the bar 74 has a trunnion 75, which is mounted in the yoke 71. A nut 76 on the end of the bar 73 holds the same in place in the bracket 70. A pair of brake bands 77 embrace the brake drums 28, said brake bands consisting of split rings having their free ends at a point diametrically opposite the bar 74. Each of the yokes 78 has base flanges 79 secured to the corresponding brake band 77 by means of the rivets 80. These yokes are secured to the respective brake bands and embrace the bar 74 as is clearly shown in Figs. VI and VIII. A sleeve 81 extends through the top of each yoke and abuts the outer side of the bar 74, and a screw 82 is threaded through the sleeve 81 and through the bar 74 and abuts against the outer surface of the brake band 77, said screw being provided with a head 83 by means of which it may be manipulated. A spring 84 is compressed between the bar 74 and the yoke 73, as is clearly shown in Fig. VIII of the drawing. A strip of friction material 85 is provided on the inner surface of each brake band 77.

The lugs 86 and 91 respectively are secured to the free ends of the brake band 77, and the lug 86 is provided with the ears 86', between which the end of the bent lever 87 is pivoted on the pin 88. Lever 87 is bent into substantially an L shape, and the upper end 89 of said lever is connected to an operating rod 90. Lugs 91 are secured to the opposite free ends of the brake bands and provided with the projecting portions 92, each of which has an opening 93 therethrough. Links 94 have the forked portions 95, embracing the lever 87, and pivotally connected thereto by means of the pin 96. The link 94 is threaded at 97 and a pair of nuts 98 are screwed thereon. A bracket 101 is carried by the disc 40 and secured thereto by the rivets 102. Said bracket 101 carries the stem 100 of the strap 99, said stem being held in place by means of the nut 103 mounted on the end thereof. Strap 99 is provided with a pair of openings through which the links 94 pass, as clearly shown in Fig. VI of the drawing. The upper end of each link 94 is threaded at 104 and a nut 105 is screwed thereon and has a lower beveled surface, which engages the lug 92.

A bar 108 has a portion 106 bent laterally at right angles thereto, and secured to the disc 40 by means of the rivets 107. The bar 108 passes transversely above the brake bands 77 and has a loop portion 109 secured thereto. The straps 110 are each secured at one end to the brake band 77, by means of the rivet 112', and each of said straps passes up and away from the brake band and through between the loop 109 and the bar 108, and has its free end slidably engaged in the loop 112 secured to the brake band 77. Screws 113 are mounted in the strap 108 and engage the brake bands 77 between the straps 110.

In order to close the inner end of the hub 17 preventing the escape of lubricant and the entrance of dust and dirt, two rings 114 and 116 are provided, which fit snugly over the axle spindle and which carry a packing ring 115. This packing ring engages the inner surface of the wheel hub and the two rings 114 and 116 have a combined length to entirely fill up the space between the bearing 15 and the hub 31, thereby taking any end thrust of the bearing.

From the description of the parts given above, the operation of this mechanism should be very readily understood. The driving power is transmitted from the propeller shaft 54, through the universal joint 53 and drive shaft 50, to the bevel pinion 55, which drives the gear 60 on the differential cage. The differential cage has its trunnions 58 mounted in the bearings 57 carried by the differential casing, so that said differential cage may revolve as a unit in said differential casing, carrying with it the differential pinions 61, which mesh with the pinions 62 on the ends of the drive shafts 63. This is the usual form of differential mechanism.

Each drive shaft 63 extends from the differential casing through the boss 43 provided on the bracket member 42, and through the opening 33 and the bearing 34 in the portion 32 of the hub member 31, and the pinion 65 mounted on the end of the drive shaft 63 meshes with the internal gear 25. The internal gears 25 are carried by the wheels, so that the internal gears and, consequently, the wheels are driven from the drive shafts 63, and differential movement between the wheels is secured by the differential mechanism located at the central part of the axle.

A grease retaining ring 45 is provided, which has a flange 47, which extends inwardly a sufficient distance so that grease or lubricant may be retained in the gear 25, at a level such that the meshing point of the pinion 65 and the gear teeth 27 is always covered by lubricant. This grease retaining ring may be very readily and conveniently stamped out of metal and may be carried by the external surface of the gear 25 by pressing the ring in place over the gear.

I have found that it is very desirable to prevent all sand, dust and dirt getting access to the internal gears and the pinions meshing therewith, and, in order to prevent the sand, dust and dirt getting in, I have provided the discs 36 having the flexible straps 38 at their edges, which engage the inner surfaces of the brake drums 28. It will be seen that the internal gear is protected, from the outside, by the spoke flange 18, and, from the inside, by the disc 36 and the strip 38, so that the internal gear and the pinion meshing therewith is entirely enclosed within the brake drum and protected so that dust and dirt cannot get at it.

The differential casing is suspended beneath the arched portion 11 of the I-beam axle 10 by means of the bolts 49, and the drive shafts 63 extend substantially parallel to the axle 10 and in the rear thereof. Casings 67, which surround the drive shafts, are connected, at their inner ends, to the differential casing 48 and at their outer ends, to the bosses 43, of the bracket members 42.

The brake bands are supported from the bars 74, which are carried by the bracket members 70, and the screws 82 may be adjusted through the bars 74, so as to apply pressure to the brake bands at the point where the screws contact therewith, so as to cause the brake bands to hug the brake drum more or less closely. The brakes are set by means of the operating mechanism comprising the levers 87, which are operated by the rods 90, and draw the links 94 downwardly to draw the free ends of the brake bands, to which the lugs 92 are attached, toward the ends of the brake bands to which the lugs 86 are attached. This mechanism serves not only to draw the ends of the brake bands, to which the lugs 91 are attached, downwardly, but the same movement also forces the opposite ends of the brake bands upwardly. Links 94 are held in spaced relation to each other by means of the strap 99, which is carried by the bracket 101 secured to the disc 40, which is attached to the axle.

The bar 108, which is secured to and carried by the disc 40 carries the straps 110, which are attached to the brake bands and serve to prevent the brake band dragging on the brake drum.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:—

1. A mechanism of the class described, comprising the combination of an axle; wheels journaled on the ends of said axle; an internal gear fixed to each of said wheels; brake hubs fixed to said wheels and enclosing said internal gears; drive shafts fixed relative to said axle; means for driving said shafts; pinions mounted on said shafts and meshing with said internal gears; and a ring mounted on the outside of each of said internal gears and provided with an annular flange extending laterally therefrom past the inner edge of said internal gear.

2. A mechanism of the class described, comprising the combination of an axle; wheels journaled on the ends of said axle; an internal gear fixed to each of said wheels; a ring stamped out of sheet metal and pressed on the exterior of each of said internal gears and provided with a flange extending laterally past the inner edge of said gear; differential mechanism supported by said axle; drive shafts connected with said differential mechanism; and pinions mounted on said drive shafts and each meshing with one of said internal gears.

3. A mechanism of the class described, comprising the combination of an axle, provided with a spindle at one end thereof; a wheel journaled on said spindle; a hub mounted on the inner end of said spindle; an internal gear mounted on said wheel; a brake drum mounted on said wheel and enclosing said internal gear; said hub being provided with a laterally extending portion; a bearing mounted in said portion; a drive shaft having one end journaled in said bearing; a pinion mounted on said drive shaft and meshing with said internal gear; a disc carried by said hub with its periphery extending substantially to the inner surface of said brake drum, and a flexible strip secured to the periphery of said disc and extending into contact with the inner surface of the drum.

4. A mechanism of the class described, comprising the combination of an axle, having a spindle at one end thereof; a wheel journaled on said spindle; a hub mounted on the inner end of said spindle and having a rearwardly extending portion, a bearing mounted in said portion; a brake drum mounted on said wheel; a disc mounted on said hub with its periphery extending substantially to the inner surface of said brake drum, a flexible strip secured to the periphery of said disc and extending into contact with the inner surface of the drum, said disc being provided with an opening in line with said bearing; an internal gear mounted on said wheel between the wheel and said disc and within said brake drum; a drive shaft having one end journaled in said bearing and extending through the opening in said disc; and a pinion mounted on said drive shaft and meshing with said internal gear.

5. A mechanism of the class described, comprising the combination of an axle, having a spindle at one end thereof; a wheel journaled on said spindle; a brake drum carried by said wheel; a hub mounted on the inner end of said spindle and having a rearwardly extending portion; a bearing mounted in said rearwardly extending portion; a disc carried by said hub and provided with an opening in line with said bearing; a flexible strip carried by the periphery of said disc substantially in contact with the inner surface of said brake drum; an internal gear mounted on said wheel within the brake drum and between said disc and said wheel; a drive shaft having one end journaled in said bearing and extending through the opening in said disc; and a pinion mounted on the inner end of said drive shaft and meshing with said internal gear.

6. A mechanism of the class described, comprising the combination of an axle, provided with a spindle at one end thereof; a wheel journaled on said spindle; a brake drum mounted on said wheel; a hub mounted on the inner end of said spindle and provided with a rearwardly extending portion; a bearing mounted in said portion; a disc mounted on said hub and provided with an opening in line with said bearing; a flexible strip carried by the periphery of said disc and contacting with the inner surface of said brake drum; an internal gear mounted on said wheel between said disc and said wheel; a drive shaft having one end journaled in said bearing and extending through the opening in said disc; a pinion mounted on said drive shaft and meshing with said internal gear; and a grease retaining ring mounted on the exterior of said internal gear and provided with an annular flange extending laterally therefrom, past the meshing point of said pinion and said gear.

7. A mechanism of the class described, comprising the combination of an axle, provided with a spindle at one end thereof; a wheel journaled on said spindle; a brake drum mounted on said wheel; a hub mounted on the inner end of said spindle and provided with a rearwardly extending portion; a bearing mounted in said portion, a disc carried by said hub, a flexible strip secured to the periphery of said disc which extends into contact with the inner surface of the drum; an internal gear mounted on said wheel; a drive shaft having one end journaled in said bearing; and a pinion on said drive shaft meshing with said internal gear.

8. A mechanism of the class described, comprising the combination of an axle, having a spindle at one end thereof; a wheel journaled on said spindle; a brake drum mounted on said wheel; a hub mounted on the inner end of said spindle and provided with a rearwardly extending portion; a bearing mounted in said portion; an internal gear mounted on said wheel within said brake drum, a grease retaining ring mounted upon the exterior portion of said internal gear, and provided with an annular flange overlying the free edge thereof; a drive shaft journaled at one end in said bearing; a pinion mounted on said drive shaft and meshing with said internal gear; and a disc mounted on said spindle between the axle and said hub and closing the inner end of said brake drum.

9. A mechanism of the class described, comprising the combination of an axle, having a spindle at one end thereof; a wheel hub journaled on said spindle and provided with an annular spoke flange; a wheel mounted on said wheel hub; a hub mounted on the inner end of said spindle; an internal gear mounted on the periphery of said spoke flange; a brake drum mounted on said wheel around said internal gear; a disc mounted on said hub, a flexible strip secured to the periphery of said disc and extending into contact with the inner surface of the drum, said internal gear being disposed between said disc and said spoke flange; a drive shaft extending through said disc; and a pinion mounted on said drive shaft and meshing with said internal gear.

10. In a vehicle structure having drive shafts for the wheels thereof, a gear casing connecting said shafts and having a portion extending forwardly thereof, an axle lying in front of said drive shaft, said axle being offset at a point adjacent said forwardly extending portion of the gear casing, and means for securing said gear casing and said axle together.

11. In a vehicle structure having two aligning drive shafts and a third shaft at right angles thereto, a gear casing connecting the ends of said shafts, said gear casing having an extension surrounding said third shaft, an axle lying parallel to said first two shafts and having an offset portion adjacent said extension, and means passing through the walls of said casing and said axle for securing said parts together.

12. In a vehicle structure, the combination of a wheel including the hub, an axle having a spindle extending through the hub, a bearing for the spindle mounted within the hub, a removable member upon the spindle spaced from the hub, a pair of rings interposed between the bearing and said removable member, and flexible material carried by said rings and serving to close the inner end of the hub.

13. In a vehicle structure, the combination of a wheel including a hub, an axle having a spindle provided with a reduced portion extending through the hub, a bearing for said reduced portion of the spindle mounted within the hub, a packing ring surrounding the reduced portion of the spindle and extending inwardly to engage the spindle beyond the point where the same is reduced and means serving to retain the packing ring within the hub.

14. In a vehicle, the combination of a wheel including a hub, an axle having a spindle extending through the hub, a bearing for the axle mounted within the hub, a removable member mounted upon the spindle exteriorly of the hub and a two-part packing supporting ring interposed between said bearing and said removable member serving to close the end of the hub and forming a thrust member between the bearing and said removable member.

15. In a vehicle structure, the combination of a wheel and axle, an internal gear drive ring secured upon the wheel, a drive shaft provided with a pinion meshing with the teeth of said internal gear drive ring and a grease retaining ring disposed upon the outer periphery of the internal gear drive ring and provided with an inwardly directed grease retaining portion.

In testimony whereof, I affix my signature.

CHARLES W. McKINLEY.